United States Patent
Raatikainen et al.

[11] Patent Number: 5,886,992
[45] Date of Patent: Mar. 23, 1999

[54] FRAME SYNCHRONIZED RING SYSTEM AND METHOD

[75] Inventors: K. Pertti T. Raatikainen, Vantaa; Juha E. Zidbeck, Espoo; Olli Martikainen, Helsinki, all of Finland

[73] Assignee: Valtion Teknillinen Tutkimuskeskus, Helsinki, Finland

[21] Appl. No.: 839,610

[22] Filed: Apr. 15, 1997

Related U.S. Application Data

[63] Continuation of Ser. No. 422,233, Apr. 14, 1995, abandoned.

[51] Int. Cl.$^6$ .................................................. H04L 12/43
[52] U.S. Cl. ......................... 370/410; 370/439; 370/460; 370/462
[58] Field of Search ............................ 370/400, 410–412, 370/438, 439–440, 443, 445, 447, 458, 459, 460–461, 462–522

[56] References Cited

U.S. PATENT DOCUMENTS

| | | | |
|---|---|---|---|
| 5,050,166 | 9/1991 | Cantoni et al. | 370/473 |
| 5,140,587 | 8/1992 | Mueller et al. | 370/460 |
| 5,157,657 | 10/1992 | Potter et al. | 370/440 |
| 5,229,993 | 7/1993 | Foudriat et al. | 370/44.5 |
| 5,241,540 | 8/1993 | Ocheltree | 370/408 |

FOREIGN PATENT DOCUMENTS 92360   4/1994   Finland .

OTHER PUBLICATIONS

A. Hopper, The Cambridge Ring—A Local Network, in Advanced Techniques for Microprocessor Systems, Hanna F. K., Ed. Stevenage, UK: Peter Pergrinus Ltd., pp. 67–71, 1980.

P. Raatikainen, J. Zidbeck, H. Flinck, Frame synchronized ring: a bus concept for high speed processing applications, Proceedings of the IBCN&S Conference, Copenhagen, Denmark, Elsevier Science Publishers B.V. (North–Holland), pp. 12.1.1 –12.1.12., 1993.

M. Zafirovic–Vukotic, I. G. Niemegeers, Performance Modeling of the Orwell Basic Access Mechanism, Computer Communications Rev. 17, Special Issue, pp. 35–48, 1987.

J. Harju, P. Raatikainen, T. Reinikka, J. Zidbeck, Analysis of a Link Layer Protocol for a High Speed Data Bus, Proceedings of the 18th Conference on Local Computer Networks, IEEE Computer Society Press, pp. 432–439, 1993.

Motorola University Prss, The Basics Book of OSI and Network Management, Sep., 1992.

VTT Technical Research Centre of Finland, Frame Synchronized Ring.12.

Primary Examiner—Min Jung
Attorney, Agent, or Firm—Merchant, Gould, Smith, Edell, Welter & Schmidt, P.A.

[57] ABSTRACT

A device-implemented method of data communications in a communications network is provided. A particular node which has data information to send is granted a turn when an incoming request signal is in an "off" state. An empty frame is captured and a frame of data information is sent in a downstream direction on the communication network when the particular node is granted a turn. An outgoing request signal is set in an "off" state when the empty frame is captured. The outgoing request signal is set in an "on" state when the empty frame is not captured and a turn has been granted. The outgoing request signal is set in an "on" state when the incoming request signal is in an "on" state and an incoming frame is not empty. The outgoing request signal preferably is sent in an upstream direction on the communication network where the upstream direction is different from the downstream direction on the communication network. A data communication network node and a communication network, which operate in accordance with the above-described method, also are provided.

29 Claims, 11 Drawing Sheets

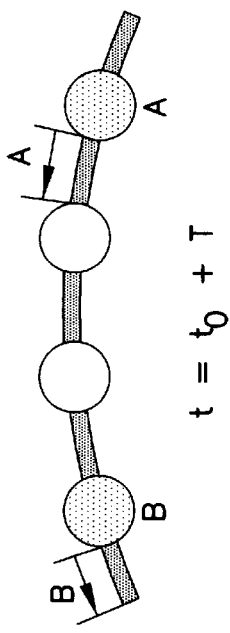
FIG. 6A  $t = t_0$
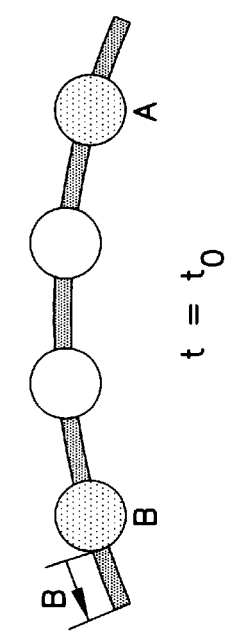
FIG. 6C  $t = t_0 + 2T$
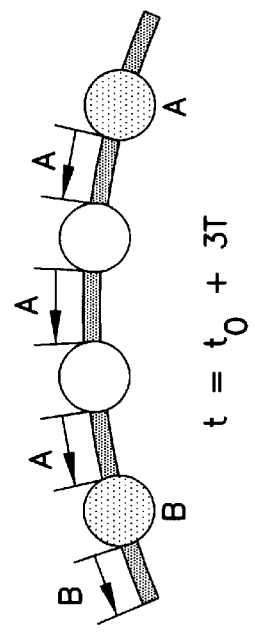
FIG. 6B  $t = t_0 + T$
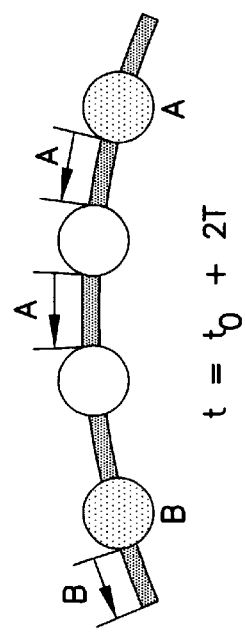
FIG. 6D  $t = t_0 + 3T$
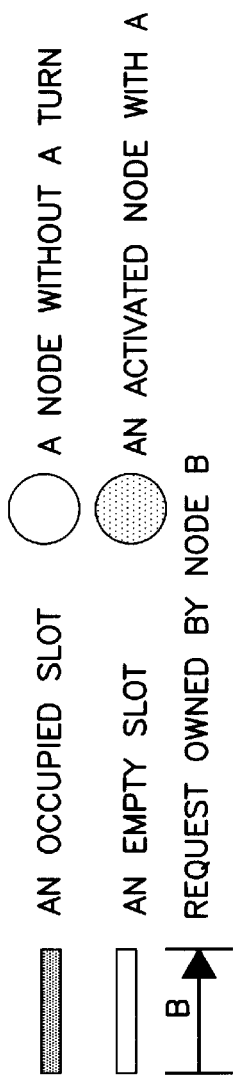

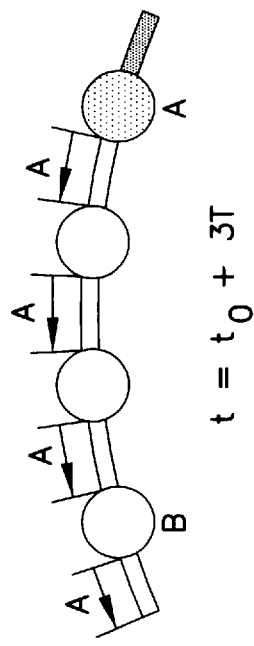
FIG. 7A  $t = t_0$
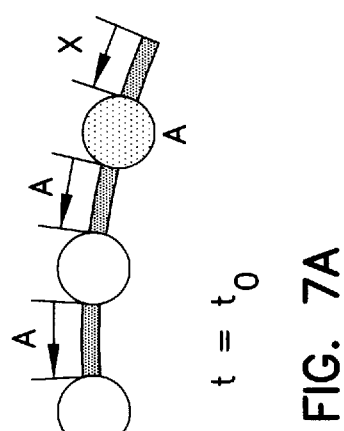
FIG. 7B  $t = t_0 + 3T$
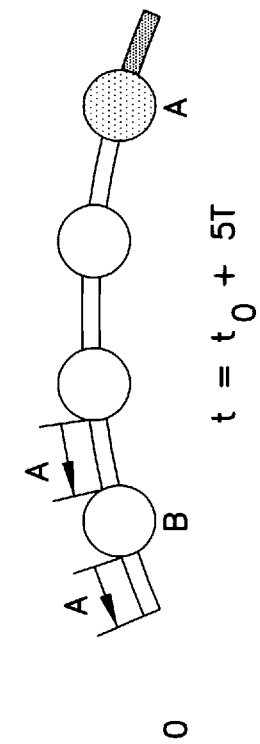
FIG. 7C  $t = t_0 + 4T$
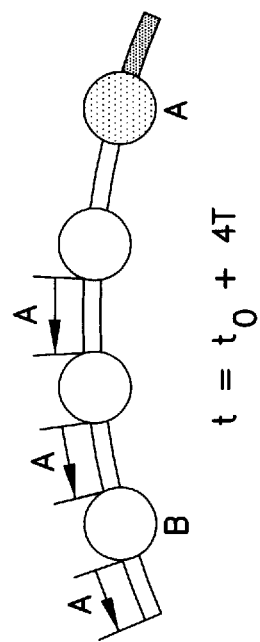
FIG. 7D  $t = t_0 + 5T$
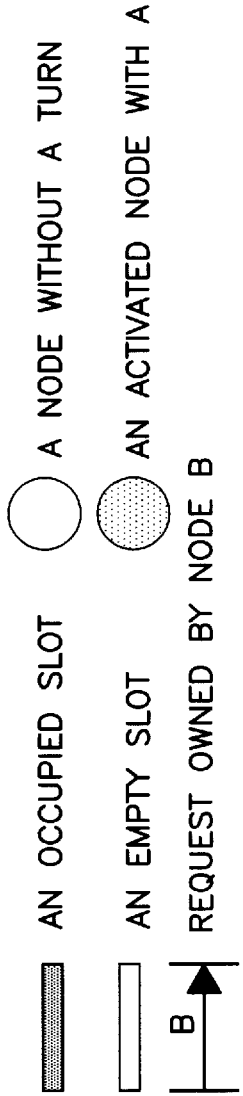

FIG. 8
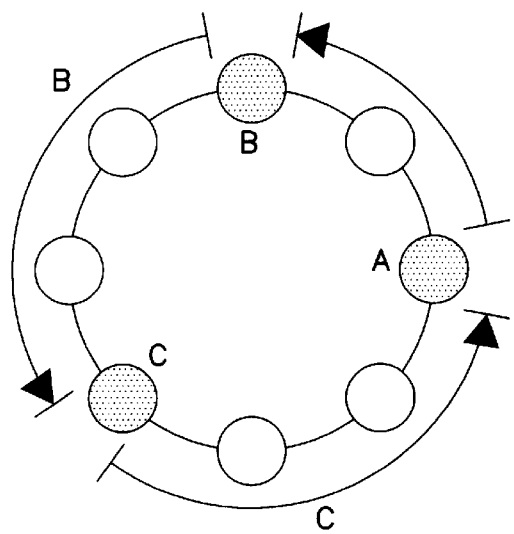
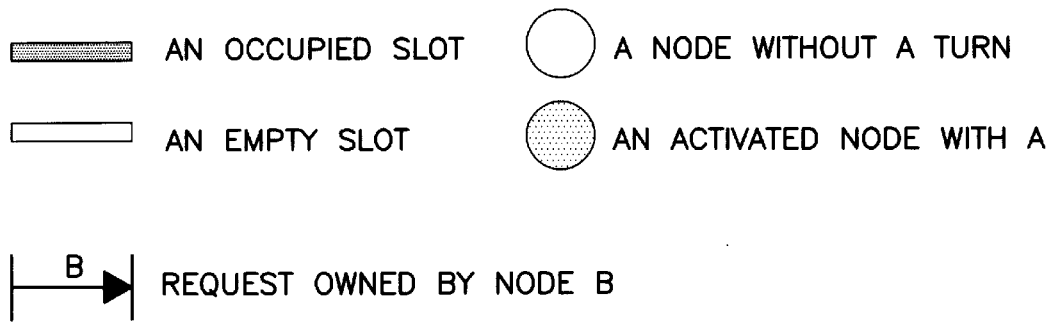

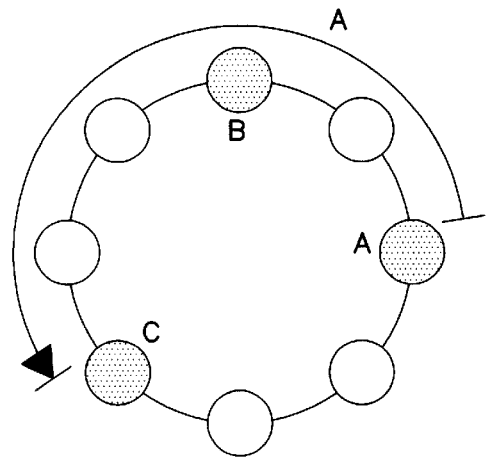
FIG. 9A
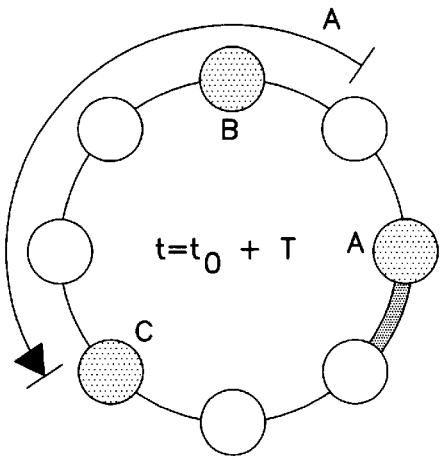
FIG. 9B
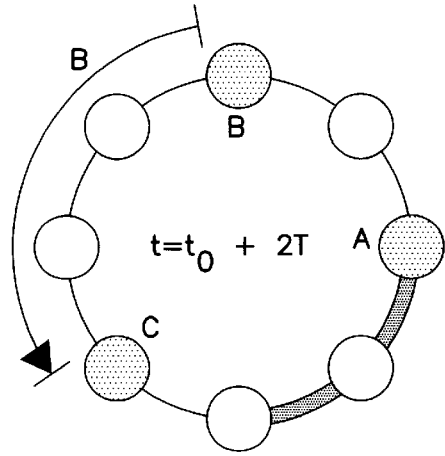
FIG. 9C
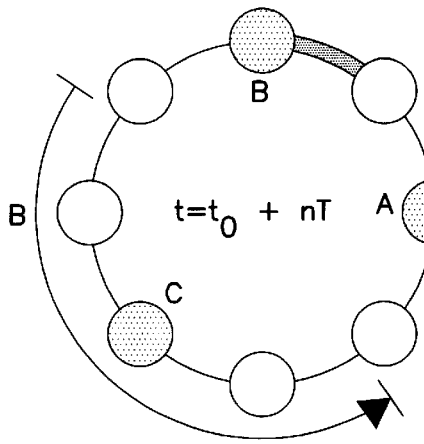
FIG. 9D
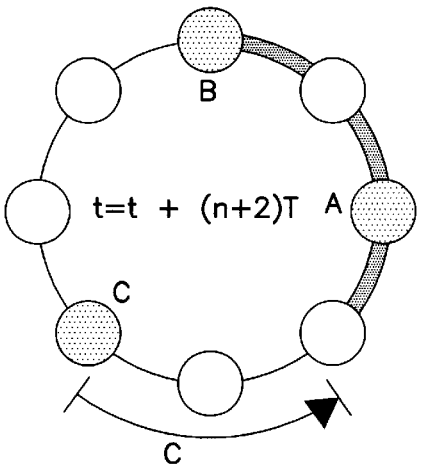
FIG. 9E
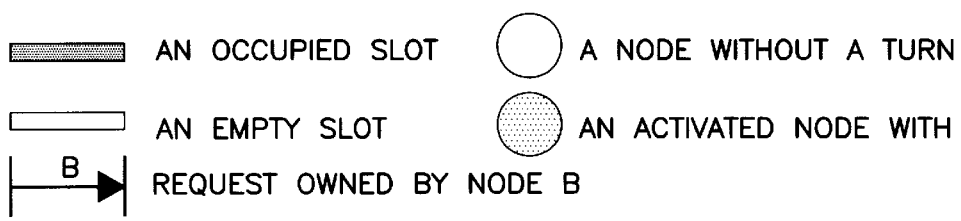

FRAME SYNCHRONIZED RING SYSTEM AND METHOD

This is a Continuation of application Ser. No. 08/422,233, filed Apr. 14, 1995, now abandonded.

FIELD OF THE INVENTION

The present invention relates generally to data communication networks. More particularly, the present invention relates to a frame synchronized system and method for data communications in a ring communication network.

BACKGROUND OF THE INVENTION

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992).

Each layer of the OSI model performs a specific data communications task, a service to and for the layer that precedes it (e.g., the network layer provides a service for the transport layer). The process can be likened to placing a letter in a series of envelopes before it's sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic back teller transaction can be tracked through the multilayer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.e., layer 4 at the destination "confirms the request for a connection," so to speak, that it has received from layer 4 at the source).

Layer 3, the network layer, provides routing and relaying of data through the network (among other things, at layer 3 on the outbound side an "address" gets slapped on the "envelope" which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data moves across those physical connections from layer 1 at the source to layer 1 at the destination.

The particular focus of the following discussion is on media access control (MAC) for communication networks which is performed in the OSI network and data link layers. It will be appreciated by those skilled in the art that various applications and components operating in the other OSI layers may be interchangeably used with the particular MAC described below so long as these applications and components adhere to the OSI design structures. For example, many different OSI physical layer components (e.g., a parallel bus, a serial bus, or a time-slotted channel) can be used in conjunction with the same MAC so long as each of the OSI physical layer components passes the particular information required by OSI design parameters to the OSI data link layer.

One particular type of communication network is the ring network. Ring nets use a series of point-to-point cables, either twisted pair or coaxial, connected between consecutive stations. The interfaces (i.e., nodes) connected to the ring nets are active (i.e., not passive like carrier sense networks).

A major issue in the design and analysis of ring nets is the "physical length" of a bit. If the data rate of the ring is R Mega bits per second (Mbps), a bit is emitted every $1/R$ microseconds ($\mu sec$). Bits are transmitted serially, just as with the Ethernet. With a typical signal propagation speed of 200 meters/$\mu$sec, each bit occupies $200/R$ meters on the ring. This means, for example, that a 1 Mbps ring whose circumference is 1000 meters can contain only 5 bits on it at once. The implications of the number of bits on the ring will become clearer later.

In all rings there is a need for the conceptual equivalent of a master clock telling each station to read one input bit and write one output bit. This master clock typically is implemented as clock signal line having encoded 0 bits as a positive pulse followed by a negative pulse, and encoded 1 bits as a negative pulse followed by a positive pulse (or vice versa). This way an idle ring still has a well defined bit pattern on it (all zeros), and timing is provided by the leading edges of the data bits themselves, without the use of a master clock.

The oldest and most popular kind of ring net is a token ring. In this kind of ring a special bit pattern, called the token, circulates around the ring whenever all stations are idle. Typically, the token will be a special 8-bit pattern, for example, 11111111. Bit stuffing is used to prevent this pattern from occurring in the data.

When a station wants to transmit a packet, it is required to seize the token and remove it from the ring before transmitting. To remove the token, the ring interface, which connects the station to the ring, must monitor all bits that pass by. As the last bit of the token passes by, the ring interface inverts it, changing the token (e.g., 11111111) into another bit pattern, known as a connector (e.g., 11111110). Immediately after the token has been so transformed, the station making the transformation is permitted to begin transmitting.

This organization has several important implications for the ring design. To start with, after reading all but the last bit of a (potential) token, the interface must be able to read the last bit and decide whether or not to invert it before forwarding any part of the bit. If the preceding bit pattern is a token, the final bit must be inverted. However, if the final bit shows that the bit pattern is not a token, that is, it is just some data, the final bit must not be inverted. This requirement means that each arriving bit must be stored in its entirety, and then a new bit generated, thereby creating a 1-bit delay in each ring interface. If there are many stations on the ring, the cumulative effect of these 1-bit delays has an important impact on the performance of the ring.

Another implication of the token ring design is that the ring itself must have a sufficient delay to contain a complete token to circulate when all stations are idle. The delay has two components: the 1-bit delay introduced by each station, and the signal propagation delay. In almost all rings, the designers must assume that stations may be powered down at various times, especially at night. If the interfaces are powered from the ring, shutting down the station has no effect on the interface, but if the interfaces are powered externally, they must be designed to connect the input to the output when power goes down, thus removing the 1-bit delay. The point here is that on a short ring an artificial delay may have to be inserted into the ring at night to ensure that a token can be contained on it.

Ring interfaces have two operating modes, listen and transmit. In listen mode, the input bits are simply copied to output, with a delay of one bit time. In transmit mode, which is entered only after the token has been seized, the interface breaks the connection between input and output, entering its own data onto the ring. To be able to switch from listen to transmit mode in 1 bit time, the interface usually needs to buffer one or more packets itself rather than having to fetch them from the station on such short notice.

As bits that have propagated around the ring come back, they are removed from the ring by the sender. The sending station can either save them, to compare with the original data to monitor ring reliability, or discard them. This ring architecture puts no limit on the size of the packets, because the entire packet never appears on the ring at one instant. After a station has finished transmitting the last bit of its packet, it must regenerate the token. When the last bit of the packet has gone around and come back, it must be removed, and the interface must switch back into listen mode immediately, to avoid removing the token or connector that follows.

It is straightforward to handle acknowledgments on a token ring. The packet format need only include a 1-bit field for acknowledgments, initially zero. When the destination station has received a packet, it need only invert the bit. Of course, if the acknowledgment means that the checksum has been verified, the bit must follow the checksum, and the ring interface must be able to verify the checksum as soon as its last bit has arrived. When a packet is broadcast to multiple stations, a more complicated acknowledgment mechanism must be used (if any is used at all).

When traffic is light, the token will spend most of its time idly circulating around the ring. Occasionally a station will convert it to a connector, followed by a packet and then a new token. However, when the traffic is heavy, so that there is a queue at each station, as soon as a station finishes its transmission and regenerates the token, the next station downstream will see and remove the token. In this manner the permission to send rotates smoothly around the ring, in round-robin fashion. Since there is only one token, there is never any contention as in the Ethernet. Higher level protocols decide whether a station must regenerate the token after one packet, or whether it may empty its entire queue first.

Although the token ring and Ethernet differ in many details, they also have many things in common. Since they use similar technologies, they can operate at similar data rates. In both cases stations must first acquire the channel before transmitting, with channel acquisition done by waiting for the token in one case and by contention in the other. Both systems have a channel efficiency determined by this wait time and transmission time. As the data rate is dramatically increased, say by using a fiber-optics medium, both networks' channel efficiency drops toward zero, because the channel-acquisition time in both cases depends on signal propagation speed, and this is not affected by increasing the data rate. Because the propagation time enters into the channel-acquisition time, both networks suffer from increased cable length, Ethernets due to increased contention slot size and token rings due to increased walk time. Under conditions of heavy load the ring operates as a round-robin, as do most of the Ethernet protocols, although the Ethernet protocols must be quite sophisticated to achieve this effect, whereas it happens automatically on the ring.

As long as 100% of the hardware and software functions flawlessly, the token ring works fine. However, if the token is ever accidentally lost, the system is in deep trouble. The traditional approach to solving the missing-token problem is to have each interface start a timer immediately prior to its searching for a token. The timer must be set to the worst case, namely all $N=1$ other stations have a maximum length packet to transmit. If the timer goes off, the interface knows that there has been a mishap, so it puts a token onto the ring and hopes for the best. Unfortunately, two or more interfaces may put tokens onto the ring at the same time, making the problem even worse.

The regeneration of lost tokens is essentially the same arbitration problem as channel allocation in the Ethernet. Another kind of ring net, called a contention ring, utilizes a contention mechanism, required for token recovery, to eliminate the channel-acquisition delay when the load is light.

Unlike the token ring, which contains a circulating token when there is no traffic, the contention ring contains nothing at all when there is no traffic. In this respect it is like the Ethernet. When a station has a packet to transmit, it checks to see if a bit is currently passing through its interface. If there is not traffic, it just starts transmission. At the end of its packet, it puts a token onto the ring, just as the token ring does. However, unlike the token ring, it also removes the token when the packet comes around again.

Now consider how a station behaves when it notices traffic on the ring at the time it wants to send. It just waits for the token, and as in the token ring, inverts the last bit, thus converting it to a connector. Directly following the connector it begins transmitting its own packet. Since the token is now missing, no other station can seize it, so there is no contention. Once the ring is completely full of bits (e.g., when the load is high), no station will ever transmit unless it has acquired the token. Consequently, under conditions of high load, the contention ring acts just like a token ring.

If exactly one station decides to begin transmitting onto an idle ring, then one station puts data onto the ring and the same station removes it. However, trouble occurs when two stations simultaneously decide to transmit onto an idle ring. In this case, the data that each station absorbs is the data the other station put onto the ring. Depending on the positions of the two stations, the packet may well be removed before it gets to the destination, hardly an acceptable situation. Fortunately each station can recognize that what it is receiving is not what it sent, especially if packets begin with the sender's address. When a station detects that such a collision has occurred, it terminates its transmission but keeps on absorbing data until there is no more. Eventually, the ring becomes quiet again, both stations wait random amounts of time, and the contention begins anew.

In summary, the contention ring has low channel-acquisition delay when it is lightly loaded, and the properties of the token ring when it is heavily loaded, the price paid being the occurrence of contention even when the hardware is functioning properly. Another point is the inability of a station to know whether or not it has acquired the channel until its first few bits have passed all the way around, been absorbed, and analyzed. In contrast, a token ring station knows immediately when it has captured the token, and an Ethernet station knows whether it has been successful within one round-trip propagation time of the Ethernet due to the 1-bit delays in each station, so the contention ring has the longest channel-acquisition time of the three systems. A plus point for the contention ring over the Ethernet is that it uses only digital logic. It detects collisions by looking at bit patterns, not by analyzing analog waveforms as the Ethernet does.

Each of the previous rings normally operates with one packet on the ring. The next two rings normally operate with multiple packets on the ring. The first of these is the slotted ring, so-called because it is slotted into a number of fixed-size packets. Unless the physical distance around the ring is very large or there are many stations, it is unlikely that there will be enough delay to hold several packets, so artificial delays are needed. These can be obtained easily by putting shift registers in the ring interfaces. Instead of the 1-bit delay as in the other ring nets, there are multiple-bit delays.

Each packet slot contains a bit that tells whether the slot is full or empty. When a station wishes to transit, it simply waits for an empty slot to come around, marks it as full, and puts its data in the slot. Of course, packets must be small enough to fit in a packet slot, in contrast to the token and contention rings, both of which support packets of arbitrarily large size.

The last kind of ring, the register insertion ring, is a more sophisticated version of the slotted ring. The interface contains two registers, a shift register and an output buffer. When a station has a packet to transmit, it loads the packet into the output buffer. Packets may be variable length, up to the size of the output buffer.

When the ring is started up, the input pointer points to the rightmost bit position in the shift register, meaning that all the bit slots including and to the left of where it is pointing are empty. When a bit arrives from the ring, it is placed at the position pointed to by the input pointer, and the pointer is moved 1 bit to the left. As soon as the address field of the packet has arrived, the interface can determine whether or not the packet is addressed to it. If so, the rest of the packet is diverted to the station, removing the packet from the ring. The input pointer is then reset to the extreme right.

If, however, the packet is not addressed to the location station, the interface begins forwarding it. As each new bit arrives, it is put in the place pointed to by the input pointer. The entire contents of the shift register is then shifted right one position, pushing the rightmost bit out onto the ring. The input pointer is not advanced. If no new input arrives, for example due to an interpacket gap, the contents of the shift register can be reduced by 1 bit and the input pointer moved right one position.

Whenever the shift register has pushed out the last bit of a packet, it checks to see if (1) there is an output packet waiting, and (2) the number of empty slots in the shift register is at least as large as the output packet. Only if both conditions are met can output proceed, in which case the output switch is flipped and the output buffer is now shifted out of the ring, 1 bit at a time, in synchronization with the input. New input is accumulated in the shift register, which is why there must be enough empty slots there to accommodate all the input while the output buffer is being emptied. Not all the slots may be needed, since an interpacket gap may arrive during output, but the interface must be prepared for the worst case. As soon as the output buffer has been emptied, the switch is flipped again, and the shift register is emptied (if it has anything in it).

An interesting property of this ring architecture is the way it prevents a station from monopolizing the ring. If the ring is idle, the shift register will be empty when an output packet has been finished, so the next output packet can be sent as soon as it can be loaded into the output buffer by the station. In effect, if the ring is idle, any station can have the entire bandwidth it so desires. If the ring is busy, however, after sending a packet the station will not be allowed to send another one because there will usually be insufficient empty slots in the shift register. Only when enough interpacket gaps have been saved up can output occur again. In essence, to send a b-bit packet, the interface must accumulate b bits worth of empty space on the ring in which to insert the packet. The b bits need not be consecutive, however, because the interpacket gaps are accumulated in the left-hand portion of the shift register.

Slotted rings are particularly suitable for high speed local area networks (LANs) and may work in some wide area network (WAN) environments.

One particular slotted ring is an Orwell ring. The Orwell ring has the most efficient access protocol of all the slotted rings due to the destination release of the slots.

The basic access mechanism (AM) (i.e., the basic MAC protocol) of Orwell consists of having a ring partitioned into equal length slots. Slots circulate around the ring and can be empty or full. A full slot is occupied by a mini-packet (i.e., a MAC protocol data unit (PDU)). Stations (nodes) are actively coupled to the ring. They repeat or modify the slots. An empty slot may be filled by a mini-packet, if there is one.

A full slot circulating around the ring, reaches the destination station which reads it and passes it on to a higher OSI layer. Each station is capable of using every empty slot that arrives and of reading every slot destined to itself.

There are two classes of basic slotted ring AMs depending on which station empties a full slot; the source station, or the destination station. After emptying the slot there are two possibilities: the slot can be used by the station that empties it, or it must be passed to the next downstream station.

Orwell implements the following basic AM. The destination station releases a slot that was full and the next downstream station may use it. More than one slot at a time can be carrying mini-packets from the same source.

The Orwell MAC protocol recognizes two service classes: class 1 for delay sensitive services, requiring a guaranteed bandwidth, e.g., synchronous traffic, and class 2 for the delay tolerant services, e.g., asynchronous data. Access is organized in intervals. Each station on the ring has a counter indicating the number of packets allowed to be sent during the interval. This way load control is provided.

Another ring network, called a Cambridge ring, maximizes the timing tolerance and minimizes the delay at the source and destination. In the Cambridge ring, the leading bit is always a one and is followed by a one and is followed by a bit to indicate whether the slot is full or empty. A control bit follows that is used by the monitor station (node) to mark as empty packets which are circulating indefinitely due to an error in the full/empty bit. This is followed by 4 eight bit bytes the first two of which are used for destination and source addresses and the last two for data. Finally there are two control bits used for acknowledgment purposes and a parity bit used for ring maintenance.

When a station (node) has a packet ready for transmission in its shift register it waits until the beginning of the next slot. It now reads the full/empty bit and at the same time writes a one at the output. If the full/empty bit was a zero it transmits the packet, if however the full/empty bit was a one the slot is already occupied and the algorithm is repeated for the next packet. This scheme minimizes the delay at each node.

The transmitted packet makes its way to the destination where the control bits are set on the fly to indicate accepted, busy, or rejected. It now returns to the source where the slot is marked empty. If the packet returns with the control bits unchanged it was not recognized by any destination. Each station knows the total number of slots in the ring and can thus clear the full/empty bit immediately.

Thus, on transmission, the packet is delayed until an empty slot is found but then the transmission is rapid. This is in contrast to the register insertion scheme where the delay around the ring can be large but the initial delay before the register is inserted is small. As the destination does not explicitly signal when it is ready to receive the next packet, the ring can easily become clogged with packets returning marked busy when devices with varying speed characteristics are being interconnected. In order to overcome this, the following algorithm is incorporated in the hardware to reduce the number of busies. If a source transmits a packet and it returns marked busy, then it is not allowed to retransmit it until some time later. This additional delay is dependent on ring loading and is approximately the time to acquire the next empty slot. If any further retransmissions are attempted, the extra delay is increased to about 16 times the original delay. Thus, the number of busies is decreased and performance is improved.

Each station possesses a station select register which is initialized by the host. This register can be set to accept or to reject all packets, or to receive from one source only. When combined with a time out mechanism it can be used to allocate resources on the ring.

A need exists for a MAC protocol of a slotted ring that is ideally suited for broadband communication networks. These networks require a high throughput data bus that can handle traffic loads that are both uniformly and geometrically distributed on the network. These broadband networks (e.g., high speed packet switching, real time video compression, real time multimedia coding, and real time security algorithm processing) have transfer rates approaching 1 gigabyte per second and as such require new solutions to remove processing bottlenecks. Since, the processing power of current processors is limited, many of these tasks need to be parallelized to multiple processors. Thus, a better MAC protocol and system for using the protocol are needed which are both efficient and cost-effective and can be used as an interconnection network for high speed multiprocessor applications.

The present invention provides a solution to these and other problems, and offers other advantages over the prior art.

SUMMARY OF THE INVENTION

A device-implemented method of data communications in a communications network is provided. A particular node which has data information to send is granted a turn when an incoming request signal is in an "off" state. An empty frame is captured and a frame of data information is sent in a downstream direction on the communication network when the particular node is granted a turn. An outgoing request signal is set in an "off" state when the empty frame is captured. The outgoing request signal is set in an "on" state when the empty frame is not captured and a turn has been granted. The outgoing request signal is set in an "on" state when the incoming request signal is in an "on" state and an incoming frame is not empty. The outgoing request signal preferably is sent in an upstream direction on the communication network where the upstream direction is different from the downstream direction on the communication network. A data communication network node and a communication network, which operate in accordance with the above-described method, also are provided.

These and various other features as well as advantages which characterize the present invention will be apparent upon reading of the following detailed description and review of the associated drawings.

BRIEF DESCRIPTION OF THE DRAWINGS

FIGS. 6a–d, 7a–d, 8 and 9a–e are node operation diagrams showing properties inherent in the preferred embodiment MAC protocol shown in FIG. 4 in accordance with the present invention.

DETAILED DESCRIPTION OF THE PREFERRED EMBODIMENT

Figure 1:
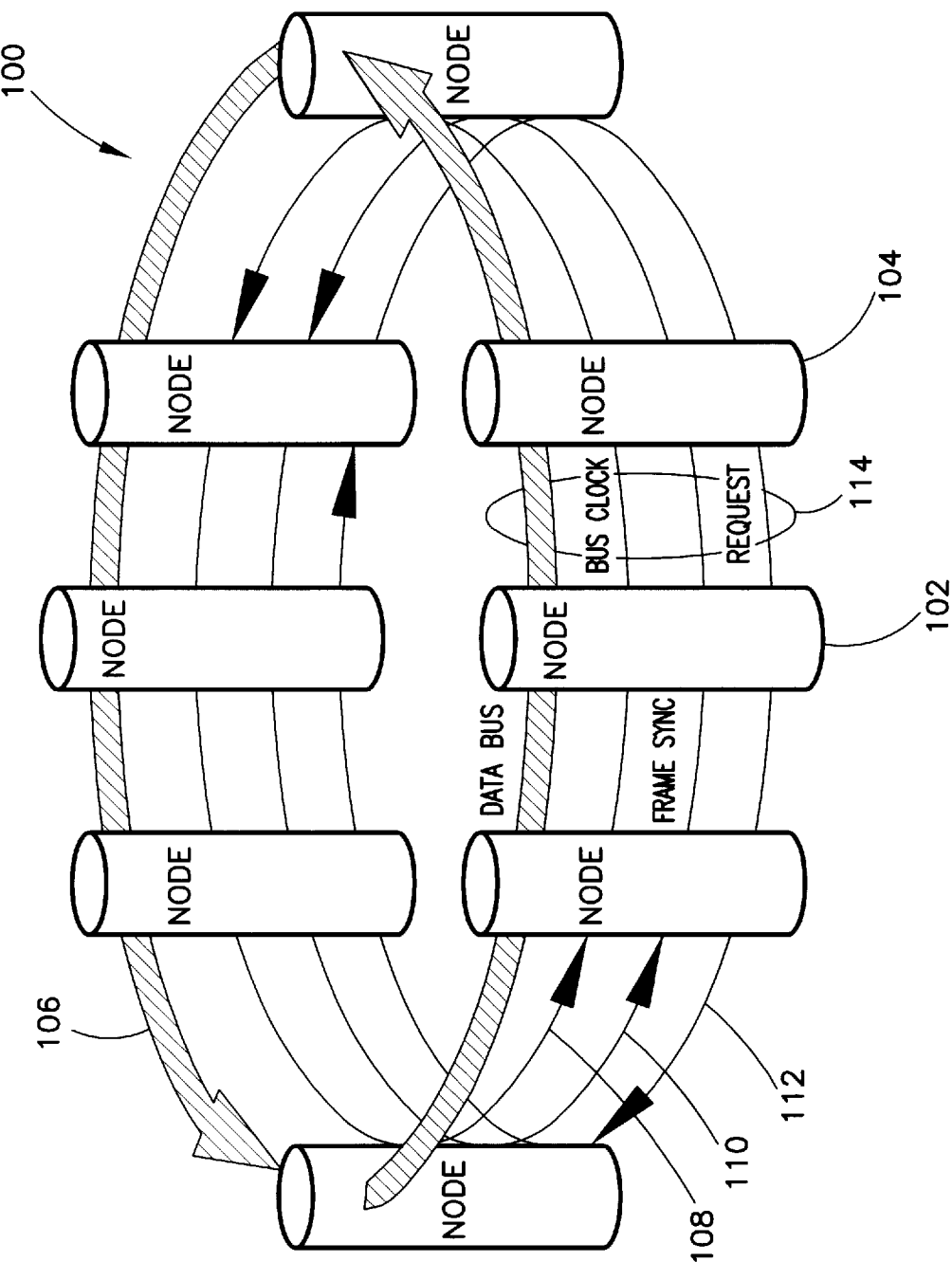
FIG. 1 is a system block diagram of a preferred embodiment communication network in accordance with the present invention.

Referring now to the drawings, there is illustrated in FIG. 1 a system block diagram of a preferred embodiment frame synchronized ring (FSR) communication network 100 (e.g., data bus) in accordance with the present invention. The FSR bus 100 is a multiprocessor bus concept, which is based on a ring topology. The bus 100 consists of nodes (e.g., nodes 102 and 104), connected together with unidirectional point to point links 114. Each link 114 includes a parallel data bus 106 and three control lines: a frame synchronization 110, a request 112, and a bus clock 108 line. The data bus 106 is typically 16, 32, or 64 bits wide, but can contain any number of parallel bits. The frame synchronization line 110 carries special synchronization pulses, which indicate the beginning of the frames. The request line 112 is used by the nodes (e.g., 102 and 104) to require access to the bus 106. The transfer direction of the request line 112 is opposite to that of the other lines 106, 108, and 110. All control and data signals are synchronized to the bus clock 108.

The FSR bus 100 may be connected to yet other rings to form vaster layouts of networks (i.e., tree- or star- or ring-structured). Networks of connecting ring networks necessitate more complex addressing schemes. Special fields of address and control bits need to be allocated into the first time slot of the data frame to enable a node to access certain nodes or groups of nodes in external ring networks. The access method, for gaining use of the ring, is controlled at the node's OSI physical layer to assure high throughput, but the optimum use of the available capacity of a larger system of ring networks demands efficient protocol control at the upper OSI layers.

The peripheral interfaces, existing at the ends of links between connecting FSR networks 100 (or at an FSR node peripheral port connecting to other networks), may implement protocol conversions for the packets, which are conveyed between differing networks. In the broadband network, the peripheral station may in fact be an interface controller, which performs packet segmentation and reassembly to eliminate differences in mini-packet lengths or structures between interconnecting networks of FSRs before entry of the mini-packet into the FSR network 100 itself. These packets are again transferred to the user, which in this case may be other LANs or peripheral interfaces of connecting FSR networks.

The FSR network is not limited to performing only pack switched connections, but supports both packet and circuit switched connections. However, the benefits of the FSR network are best shown in various high throughput switching applications. In broadband networking, the FSRs can be used as the central control components to construct high throughput asynchronous transfer mode (ATM) routers, switches, and bridges, where the manipulation of high data rates in real time is a necessity. The FSR network itself or a group of FSR networks can be used to form a high throughput LAN or varying larger network layouts of connecting ring networks. On the other hand, the FSR network can function as a multi-access multiplexing station between a gigabit network and various user applications, such as distribution of Video on Demand services.

The FSR can also be used in a broad range of high speed multiprocessor and multimedia environments, in which high data rate parallel processing is an absolute requirement. In the multimedia environment, an FSR network can be configured to support, for example, 50 video connections at 10 Mbps each or optionally over 200 connections at 2 Mbps each. Such a FSR network would function as a real time switch for digitized video connections, but simultaneously also could support other data connections.

Figure 3:
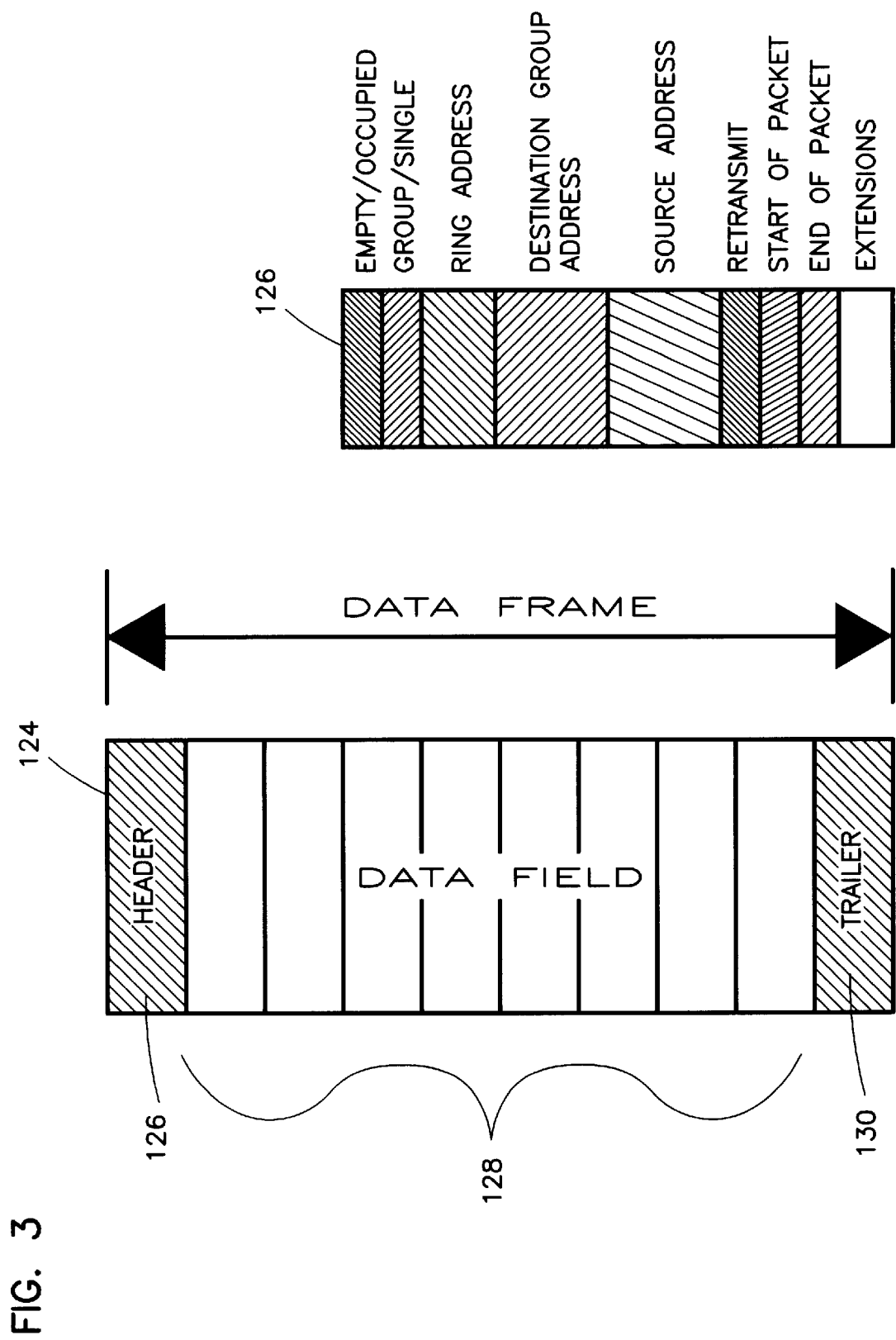
FIG. 3 is a block diagram of a preferred embodiment frame and frame header subfields in accordance with the present invention which are passed between nodes in the communication network shown in FIG. 1.

Data is conveyed in fixed length frames 124 preferably having a particular frame structure shown in FIG. 3. The frames 124 are divided into a number of slots. Each frame 124 is transmitted from node to node in one bus clock cycle. The number of slots in a frame 124 is equal to the number of nodes in the ring 100. It will be appreciated by those skilled in the art that including "virtual" nodes within the existing "physical" nodes enables the use of larger frame 124 lengths. Therefore, it is possible to create any number of parallel data slots within the frame 124, unrestrictedly.

This scheme enables, for example, the dimensioning of the frame to fit a whole ATM-cell, thus avoiding the need for splitting the cell when transferring it through the FSR communication network 100. For an ATM communication network having 7 "physical" nodes, these "physical" nodes can be split into 53 "virtual" nodes so that a single ATM cell is carried on one 53 byte long frame 124. It will be appreciated by those skilled in the art that the number of "virtual nodes" in the communication network 100 may need to be varied depending on a slot width or ring width. Also, a communication network 100 may be configured with more nodes than slots. In this case, more than one frame will need to be transmitted around the network at a time (e.g., 10 nodes with 5 slots can be carried by two frames circulating on the ring).

The first slot is the header 126, which contains addressing, control, and status information. The address and other control subfields are used for flow control. If the frame length L is small and the bus width N is large, it is reasonable to have a header of only one time slot long. The rest of the slots form the data field 128. The data field includes the actual data, which is to be conveyed from the source Node to the destination Node. The length of this field is normally larger than the sum of the other two fields. The last field in the frame is the trailer 130, which includes the frame check sequence. The trailer is an optional field, and it is used if the frame length is long. When the frame length is small, the use of the trailer contributes to an excessive amount of overhead.

The payload of the FSR communication network 100 is defined as the total number of bits in the frame 124 minus the bits in the header 126 and possibly the trailer 130. Therefore, adding virtual nodes into the network also increases the payload of the network, respectively, because the proportional size of the header 126 decreases as the length of the frame 124 increases with added nodes.

Returning once again to the header, the header 126 is divided into several subfields, which are illustrated in FIG. 3. The first subfield is one bit wide, and it indicates whether the frame 124 is occupied or idle.

The second subfield, also one bit wide, is linked to the destination address field, and it indicates whether the address is a group address or an individual node address. Group addressing can be used, when the frame 124 is to be delivered to several nodes. Single addressing is used when the frame 124 is addressed only to one node. The optimum size of the destination address field is equal to log2(M) bits, where M is the number of nodes in the ring 100.

The third subfield is the ring address field, which is in use when several rings are connected together to form a network of rings. Individual rings can be connected to form for example a star-structured, a ring-structured, or a tree-structured topology. The nodes, connecting rings together, have to be able to identify the addresses of the other rings. The optimum size of this field is equal to log2(K), where K is the number of rings connected together.

The fifth subfield is called the source address field, and it indicates the address of the transmitting node. The optimum size of this field is equal to log2(M). If the frame 124 traverses from a ring to another, the address in this field is replaced by that of the connecting node in the receiving ring. The field is utilized, when the destination node has not been able to receive a frame, addressed to it. The node, which receives frames that have its own source address, interprets this situation as these frames originated by itself not having been received and removes them from the ring 100. This mechanism is important to avoid blocking, especially in situations, when any one of the Nodes is permanently incapable of receiving frames.

The next one bit field is called the retransmit subfield, which is closely related to decoding of the source address field. The retransmit bit is used by the destination and source nodes in a situation, when the destination node is not able to receive a frame addressed to it. The destination node activates the retransmit bit, which indicates to the source node that this frame must not be deleted. When a node receives a frame that is originated by itself and the retransmit bit is active, the node deactivates the bit and passes the frame back to the ring or retransmits the frame after a predefined delay. The use of this subfield is optional.

In additional to the aforementioned subfields, there is a field called the control field. This field includes extra bits reserved for future needs, some of which may be application dependent. One such requirement is related to the transfer of long data packets. Long packets have to be divided into several mini-packets, which are conveyed in the frames. The source must indicate the beginning as well as the end of the packet to the destination. One bit, in the control field, can be reserved to indicate the first frame and another bit the last frame of the packet. Extra bits can also be used to indicate to what connection a particular mini-packet belongs.

The FSR bus 100 is a multi-access network, where the access control (i.e., operations of the MAC protocol) is distributed between the nodes. Each node contains the necessary control logic to monitor the by-passing traffic to decide when to receive and when to transmit data. Required decisions are made according to the states of the control signals 108, 110, and 112 and the information in the control fields 126 of the frames 124.

For wide area networks (WANs), the parallel bus and frame synchronization line can be combined and serialized. The serial bit stream will be line coded to convey timing information as previously discussed such that a separate clock line is not needed. In this serial application of the MAC protocol, the request line can be used to convey requests as well as other control information.

Applications transmit data by setting packets into the node's interface buffer 122, and the interface control logic 118 (i.e., processor 118) divides the long data packets into smaller mini-packets (i.e., MAC-PDUs), that are conveyed in the frames 124 from the source node 102 to the destination one (e.g., node 104). The received minipackets are combined to form the original data packets, that are then delivered to the destination applications by the destination node's buffer 122.

Figure 4:
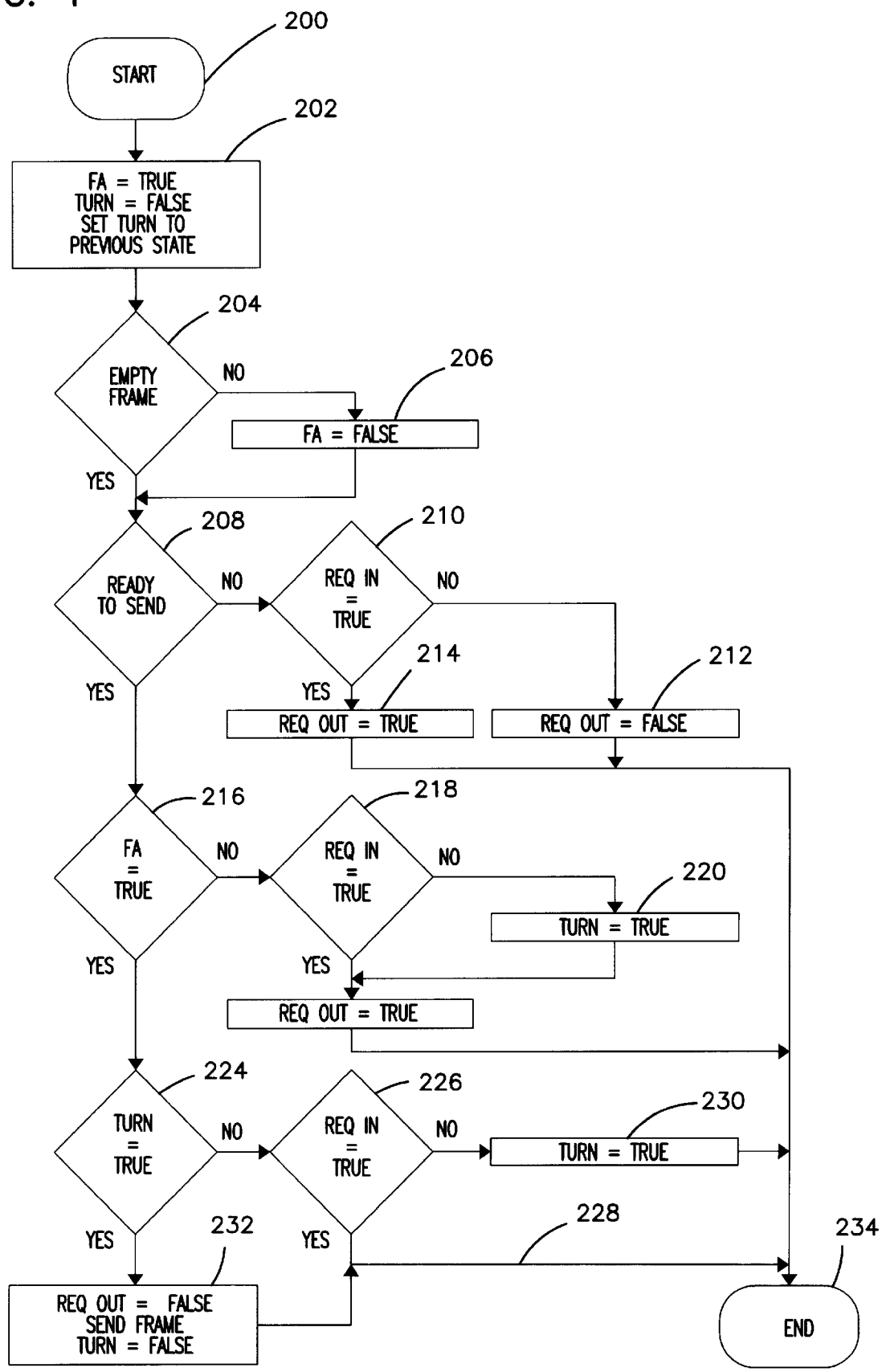
FIG. 4 is a flowchart of a preferred embodiment general media access control (MAC) protocol in accordance with the present invention under which the nodes of the communication network shown in FIG. 1 operate.
Figure 5A:
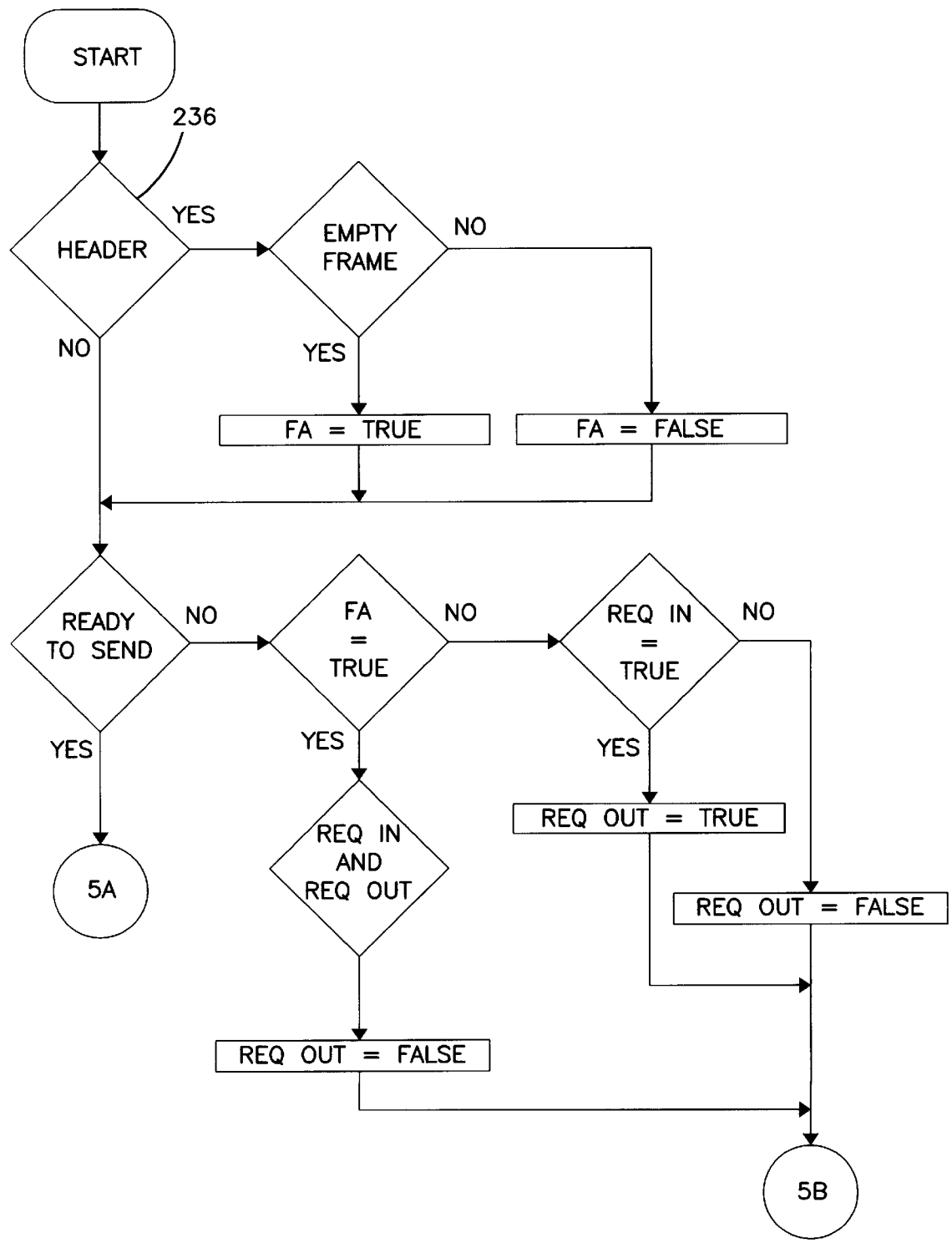
FIGS. 5-A through 5-D are flowcharts of a specific parallel data bus, slotted frame preferred embodiment MAC protocol in accordance with the present invention which follows the general MAC protocol shown in FIG. 4.
Figure 5B:
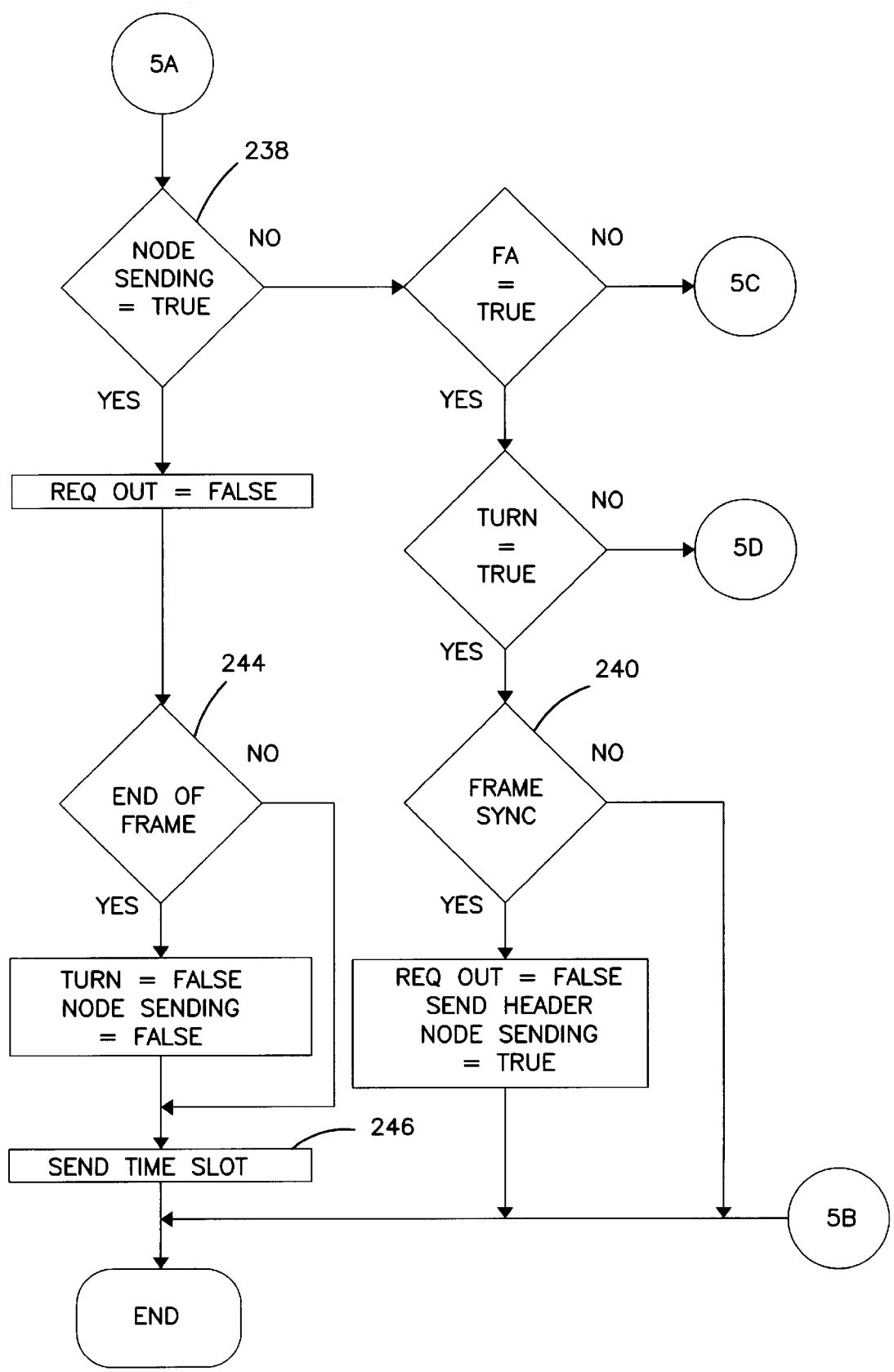
Figure 5C:
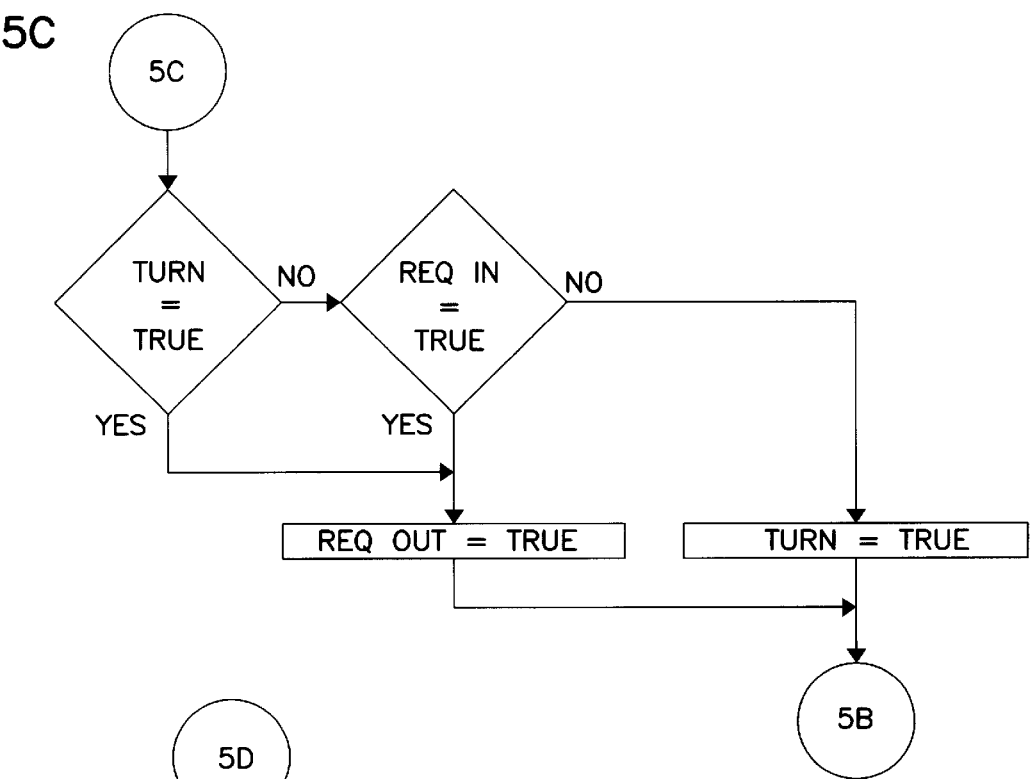
Figure 5D:
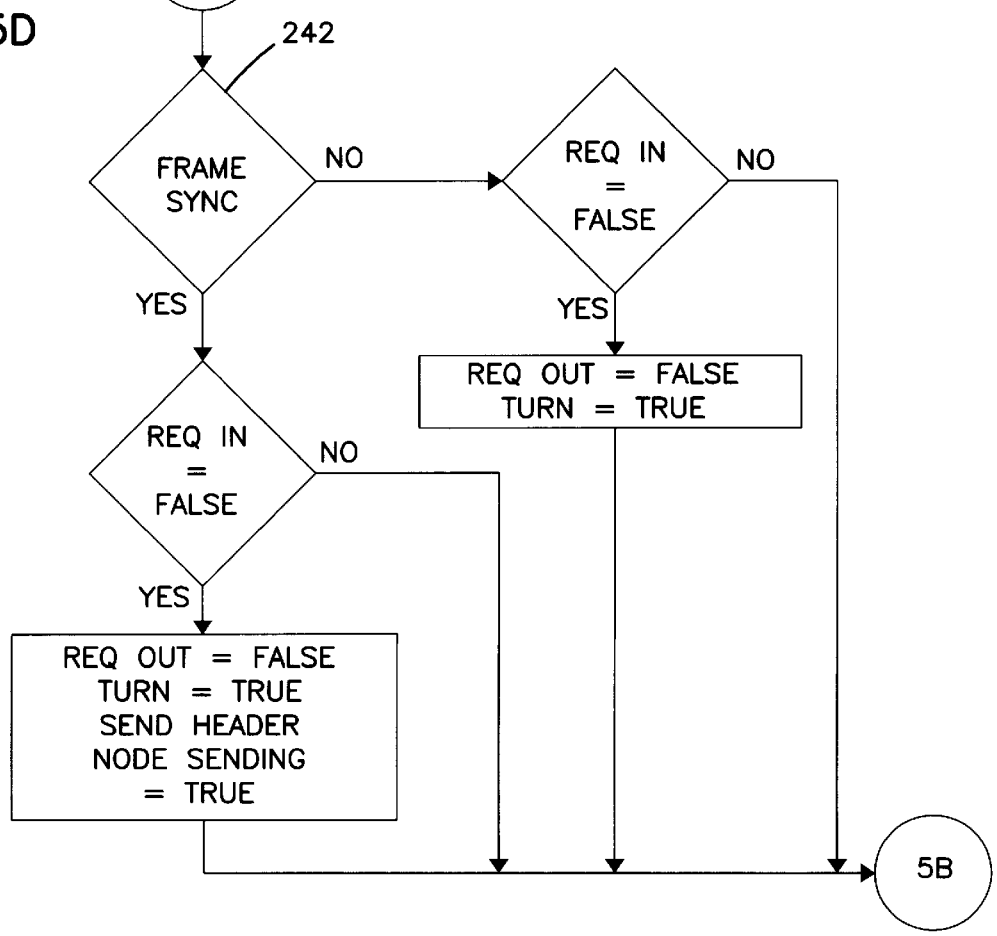

Transmission of data and access to the bus follow certain rules, which form the MAC protocol. A preferred embodiment MAC protocol control algorithm at a generally high-level is shown in FIG. 4. A more specific flowchart of a specific parallel data bus, slotted frame preferred embodiment MAC protocol control algorithm is shown in FIG. 5. This specific embodiment follows the general MAC protocol control algorithm shown in FIG. 4.

The notion of a turn has an important role in the algorithm. The turn is related to the state of the request line at the node, which has data in it's transmit buffer and is trying to get access to the bus. As opposed to a token in various versions of token rings, the turn is a local concept, which means that there can be a varying number of nodes on the bus simultaneously having a turn.

In the following discussion, the frame 124 is considered empty by a node, if the incoming frame 124 is empty or if the node is the single receiver of the frame 124 (i.e., the node empties the frame 124). Also, downstream refers to the direction of the data flow and upstream to the opposite direction (i.e., the direction of the request flow).

When a node has data to send 208, it must wait for its turn 224 to start the transmission 232. When the node gets the turn 230, it has the right to capture the first arriving empty frame. As the empty frame arrives 216, the node starts transmission and continues transmitting 232 until it has transmitted all its data or until there are no more empty frames 206 available for the node or the node is interrupted by an incoming request 226. If the node transmitted all its data, the node releases the bus resources. If the flow of empty frames is stopped, the node requires more service. However, if the transmission is stopped by an incoming downstream request 226, the node releases the bus 228 and begins to wait for a new turn 224.

In general, the turn is granted to a node, when it has data to send 208 and there are no simultaneous on-going requests on the downstream side of the data bus. In case of on-going downstream requests, the node must wait until the requests are removed to get its turn. When the node does not have a turn, it neither can require service nor can it access the bus. It should be recalled that the turn is granted locally, which means that there can be several simultaneous "turns" on the bus.

If the node, which has a turn 220, but has not yet started transmission, receives occupied frames, the node sends out a request 222. The request 222 is held on the request line until the node receives an empty frame 216 and gets access to the bus. The request is removed 232 at the instant, when the transmission is started. If the node is suspended from transmission by the downstream request, the node gets a turn 202 immediately when it detects that the request is removed (this is done by have the turn state condition restored at step 202 to its previous state). If the presently incoming frame is occupied, the node also sends out a request 222. The next upstream node does not, in this case, detect any discontinuity in its incoming request signal. If, however, the incoming frame is empty 216, the request is not issued 224 to 232 and the out-going request signal is turned to an inactive state 232.

The requests play a key role in sharing the bus resources and are handled in the nodes in the following way. When the node receives a request from downstream, it either passes the request to the upstream or suspends it. The request is passed if the node is receiving an occupied frame and, at the same time, the node does not have a turn. The request is suspended if the node has a turn or the incoming frame is empty. If the node is transmitting on arrival of the downstream request, the node stops transmission after the on-going frame and releases the bus.

The suspended requests are forwarded upstream, when the cause of suspension is removed. A special case arises when the suspension is caused by the node's own request. In this case, the suspended request is passed upstream no earlier than the duration of a frame after the removal of the node's own request. The neighboring node on the upstream side of the data bus detects a discontinuity (i.e., an inactive state) in the request signal. This is an important feature in the access control to guarantee fair use of the bus.

When the request is forwarded upstream, the upstream request line is kept active in all circumstances 214, 222, and 228 until the downstream request line is turned to the inactive state. This means, that once the request is passed, it is not suspended until the downstream request is removed; not even in the case of empty frames coming from upstream.

Unlike in many other ring bus schemes, the FSR MAC protocol is distributed between the nodes. This eliminates the need for a separate centralized control unit, which in turn leads to FSR's cost-effectiveness. In this distributed protocol all control decisions are made according to the states of the control signals and the information in the frame header.

FIG. 5 describes a specific parallel data bus, slotted frame MAC protocol control algorithm that generally follows that which is shown and described in reference to FIG. 4. The differences in FIG. 5 are related to the fact that this control algorithm does not assume that it is being run once each time a frame is received and the node sends discrete slots of a frame rather than a whole frame.

Some of the specific changes include looking for a header 236, checking whether the node is presently sending 238, performing actions only when a frame synchronization pulse signal is received 240,242, checking for an end of a frame 244, and sending only a time slot of data information 246 (rather than a whole frame). As will be appreciated by those skilled in the art FIG. 5 shows one method for integrating these changes into the MAC protocol flowchart of FIG. 4.

The MAC protocol control algorithm also can be described in reference to a set of rules that each node in the communication network 100 must follow. The node's processor 118 implements these rules in conjunction with the other node components. These rules include:

RULE 1. (The node must have a turn.) A node having data to send (called an activated node), must first acquire a turn.

RULE 2. (How to get a turn?) A turn is granted to an activated node immediately if the incoming request signal 112 received by the receiver mechanism 116 of the node is in an "OFF" state. Otherwise, at the moment when the incoming request signal 112 switches from an "ON" to "OFF" state.

RULE 3. (How to use a turn?) When the node has a turn, it owns the right to capture the first empty frame to convey its data to be sent which is being held in buffer 122.

RULE 4. (What happens to the outgoing request line, when the node gets a turn?) If the frame 124 currently traversing the node, which has just received the turn, is empty, the outgoing request signal 112 transmitted by a node transmitter mechanism 120 will be set or kept in an "OFF" state. Otherwise, the node immediately sets the outgoing request signal 112 in an "ON" state and keeps it in the "ON" state until it receives an empty frame. If the obtainment of the turn was enabled by the removal of the downstream request, which was passed through the node to upstream, the outgoing request signal 112 is kept in the "ON" state. In this case, the next upstream node does not notice any discontinuity in the "ON" state signal on its incoming request line 112.

RULE 5. (How does the node react to incoming request line signals, when it has a turn?) While waiting for an empty frame 124, the node with a turn suspends the request possibly coming from the downstream (i.e., the node does not react to the incoming request signals 112 in any way).

RULE 6. (When does the node lose its turn?) The node loses the turn only after it has captured and used an empty frame 124.

RULE 7. (What happens to the outgoing request line signals at the beginning and at the end of transmission?) The outgoing request signal 112 is set in an "OFF" state at the start of transmission. When the transmission is ceased, the node passes the possibly existing and suspended downstream request upstream if the currently incoming frame 124 is occupied; otherwise, the outgoing request signal 112 is kept in an "OFF" state. When the outgoing request signal 112 is set to an "ON" state as a result of an incoming downstream request line 112 state, it will be kept in the "ON" state as long as the incoming request signal 112 stays active (even in the case of incoming empty frames 124).

RULE 8. (How does a non-active node react to incoming request line signals?) If an occupied frame 124 is currently passing a non-active node and this node receives an incoming request signal 112, then the request signal 112 is immediately passed unchanged upstream. Otherwise, the node suspends the incoming request line 112. The non-active node sets the outgoing request signal in an "OFF" state only when the downstream request signal is set in an "OFF" state.

On the basis of the above rules, a number of properties can be derived which show the fairness of this preferred embodiment FSR MAC protocol control algorithm. The following discussion will first show that a node, having a turn, will get access to the bus 106 after a certain waiting time. Then, it will be shown that an activated node will always get a turn. These two properties together show that the FSR bus 100 is fair in the sense that all nodes, having data to send, will also get access to the bus 106.

PROPERTY 1. An incoming request signal at a node (B) can be uniquely assigned to another node (A). A owns the signal seen by B.

Proof. Define A to be the first node downstream from B, that has a turn. According to rules 4 and 6, there can be no other requests between node A and B, if there are no other nodes between them having the turn. Therefore, the only request seen by B must belong to A.

PROPERTY 2. If node B sees the incoming request signal owned by A, then the first empty frame passed by B can be used only by A.

Proof. In this case, the request signal general high-level 112 is continuously in an "ON" state from A to B, and according to rule 2 no intermediate node can get the turn before A has received the empty frame and removed its request. In FIGS. 7a–d node A is requiring service, and the first empty frame is forwarded to it. After getting the empty frame, node A starts transmission and removes its request.

PROPERTY 3. If a node A (having a turn) does not receive an empty frame, the request owned by A is automatically forwarded upstream through the non-active nodes to an active node that also has a turn. In FIGS. 6a–d node A is activated and gets a turn when an occupied frame is passing it (t=t0), and its request is forwarded to the next upstream node B with a turn by the time t=t0+3T.

Proof. This follows directly from rules 7 and 8.

PROPERTY 4. A node, having a turn, will eventually receive an empty frame.

Proof. Suppose A does not get an empty frame, but all the other nodes with turns do get access to the bus. Then, A's request would proceed upstream (rule 4 for nodes with turns, and rule 7 and 8 for nodes without turns) and, in the worst case, eventually round the ring to the node next to A on the downstream side, in which case no other node could consume the empty frames (property 2). Therefore, A will certainly get an empty frame. In another case, A's request is suspended by another active node (with a turn) which does not get access to the bus, either. The other node's request must be suspended by some other node and so on. The suspended requests from a circle in the ring (See FIG. 8 where nodes A, B and C suspend each others' requests and form a circle). The rest of the nodes, which have not issued requests, cannot have turns, and hence they also are unable to capture empty frames. So, one of the requesting nodes will definitely receive an empty frame, thus breaking the deadlock. This shows, that the assumption, that A does not get an empty frame, leads to a contradiction. At first, B and C are blocked from getting a turn by node A's request. When A starts transmission at t=t0, B gets a turn at t=t0+2T and C is blocked by B's request. After some time, B gets an empty frame, starts transmission, and removes its request. Node C gets a turn when it receives a break in the incoming request signal.

PROPERTY 5. A node, having data to send, will get a turn.

Proof. The activated node, C, must wait until there is a break in the incoming request signal. Let A be the node that owns this signal. When A gets access to the bus (property 4), it sets a break in its outgoing request line. Yet, C may not immediately get a turn. This break can be utilized by an activated node B, between A and C (rules 2 and 4), so that B becomes the owner of the incoming request signal seen by C. Hence, B gets a turn before C, which now must wait for the break in the request signal, owned by B. Since there is a finite number of nodes between A and C, C ultimately will see a break in the incoming request signal, and it gets a turn (see FIGS. 9a–e where requests from nodes A and B are temporarily obstructing node C from getting a turn).

COROLLARY 1. Frame Synchronized Ring (FSR) MAC protocol is fair.

Proof. Combination of the properties 4 and 5 immediately yields this result. From the various situations discussed in the proofs of the properties 4 and 5, it can be seen that there exists a maximum number of slot times, depending only on the number of nodes in the ring, that an activated node may have to wait before it gets access to the bus. Yet, it is obvious that this maximum number is quite large, and the waiting times of that order of magnitude correspond to extremely unlikely activation/deactivation sequences among the nodes.

Figure 2:
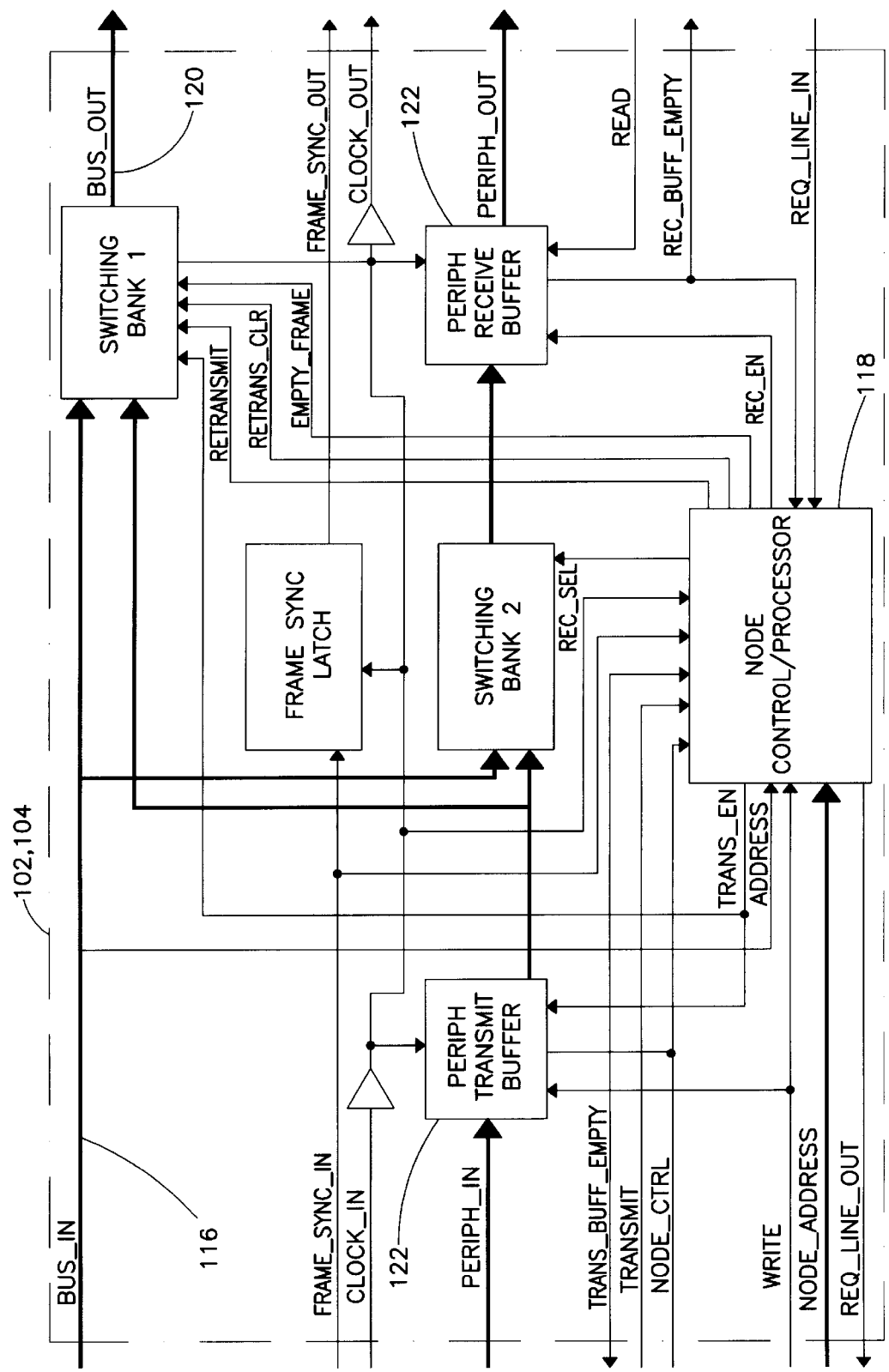
FIG. 2 is a block diagram of preferred embodiment node in accordance with the present invention which operates in the communication network shown in FIG. 1.

Returning to a discussion of FIG. 2, each node (e.g., 102 or 104) is an intrinsic part of the FSR-bus 100 and functions as a data switching link to a peripheral (not shown). The interface 122 (buffer 122), between the node and the user's peripheral, can provide a standard or application specific connection to the peripherals data port. In a broader sense, the peripheral may be another intelligent interface to a neighboring FSR-bus, enabling varying layouts of connecting rings.

The node has an input port 116 (receiver 116) and an output port 120 (transmitter 120). The pair of input and output ports functions as an interface to the ring bus 114. Another pair of input and output ports on the buffer 122 operate as an interface to the peripheral device. Data at the input ports may be switched to either or both of the output ports.

As previously noted, a serial request line 112 is located adjacent to the ring data bus 106. The requests for use of the ring bus 106 traverse in the serial line 112 in the direction opposite that of the data bus 106 (See FIG. 1).

Data is sent in parallel form in frames, which consist of at least as many consecutive time slots as there are nodes in the ring 100. The frames are transferred time slot by time slot from node to node controlled by the bus clock. The bus cycle is defined as the period that a time slot traverses from the input of a node to the input of the next node.

The functions of different parts and signals of the node's high level block diagram (FIG. 2) are now explained, along with those portions of the FSR MAC protocol as it pertains to the functions at hand. Both ports, connecting to the ring, function synchronously in step with the ring clock. This ring clock is a system clock fed to a CLOCK_IN pin of each node. The incoming frame is indicated by a frame synchronization pulse 110 arriving simultaneously with the fist time slot of the frame.

The frame synchronization pulse 110 is fed to a FRAME_SYNC_IN pin of each node and passed through the node to a FRAME_SYNC_OUT pin of the node via a FRAME SYNC LATCH block. The parallel data words are stepped forth around the ring on each cycle of the signal at the CLOCK_IN pin. The data from the ring is fed to BUS_IN port/receiver 116 and the data switched back to the ring is fed to the BUS_OUT port/transmitter 120. The FRAME_SYNC signals 110 are located adjacent to the corresponding BUS signals 106 from node to node. The first time slot is sent to the outgoing bus on the same bus cycle as the synchronization pulse is passed to the next node. The first time slot of the frame contains the address and control fields, which the node detects from the ADDRESS-signals in the NODE CONTROL block when receiving the frame. These fields provide information on the frame's data content type and the steps of control to be executed with the frame. The rest of the frame's time slots consist of application specific data.

The input port/receiver 116 from the ring has priority over that buffer 122 port of the peripheral. Therefore, the pair of buffer 122 input and output ports, interfacing to the peripheral device, both have buffer memories. The peripheral sets the data frame, to be transmitted, into the peripheral TRANSMIT BUFFER (one part of buffer 122), and the node controls the transmission to the ring. The node transmits data to the ring in a frame format, and the received frames of data are stored into the peripheral RECEIVE BUFFER (another part of buffer 122). Both ports, connecting to the peripheral device, function asynchronously with respect to the ring clock, but may also be implemented to function synchronously with the ring clock. Using the buffer memories, data speed differences between the peripheral device and the ring bus can be eliminated, and necessary phase adjustment can be performed to adapt the interfaces together.

Both buffers are of addressable type and output a buffer empty signal with either TRANS_BUFF_EMPTY or REC_BUFF_EMPTY signal, depending on the portion of buffer 122 in question. When writing to the TRANSMIT BUFFER portion of buffer 122, the peripheral interface handshakes with the node by polling the TRANS_BUFF_EMPTY signal until it becomes active, indicating room for transmit data. Then, the peripheral writes the frame into the buffer 122 by clocking each word with the WRITE-signal to a PERIPH_IN pin on the buffer 122. The peripheral may also write local commands directly to the NODE CONTROL block (i.e., the processor 118) by activating the NODE_CNTL signal, in which case the word at the PERIPH_IN pin is not written to the TRANSMIT BUFFER. Instead, the word is handled directly by NODE CONTROL 118. Examples of such cases are local initialization or test loop routines. In the latter case, the REC_SEL signal is activated to send the TRANSMIT BUFFER contents directly to the node's own RECEIVE BUFFER.

After the peripheral has written its frame to the TRANSMIT BUFFER, it activates the TRANSMIT line to signal the NODE CONTROL that the buffer is full. The TRANSMIT BUFFER is emptied under the control of the TRANS_EN signal from the NODE CONTROL block. The TRANS_EN is activated at the start of the FRAME_SYNC_IN pulse, indicating the beginning of the ring bus frame. It is kept active for the length of the frame while the data slots are clocked to the BUS_OUT in step with the buffered system CLOCK_IN-signal.

On the receive side, the peripheral interface handshakes with the node by polling the REC_BUFF_EMPTY-signal. The RECEIVE BUFFER has data slots to be read as long as this signal is not active. The peripheral reads the buffer 122 contents by clocking the data slots in step with it's READ signal. The NODE CONTROL block controls the writing to the RECEIVE BUFFER with the REC_EN-signal. When active, the data slots are clocked to the buffer 122 in step with the buffered system CLOCK_IN-signal.

After a node has inserted its data frame into the TRANSMIT BUFFER and the NODE CONTROL has not detected an empty frame, it begins to send binary ones to the serial request line, the REQ_LINE_OUT. When the binary ones arrive at the REQ_LINE_IN pin of the first node using the ring, this node releases one empty frame, after the currently transmitted data frame has been sent or after a fixed number of frames, to free access to the data bus. An empty frame is marked by the EMPTY_FRAME-signal from the NODE CONTROL block. This marking is performed by setting the Empty/Occupied Frame bit in the first time slot of the frame (see FIG. 10). It will be appreciated by those skilled in the art that the contents of the first time slot of the frame may vary in different environments, because some of the bits carry application specific information.

When the empty frame arrives at the node, which originally gave the request for bus use, the node can transmit its data frame, pending in the TRANSMIT BUFFER, to the data BUS_OUT. As this node receives the acknowledge for bus use, it removes its request by again sending binary zeros to REQ_LINE_OUT. If data is being received from the ring at the same time as the TRANSMIT BUFFER is waiting for transmission and the received data is addressed to the node itself, then transmission of the frame in the TRANSMIT BUFFER may begin immediately, while simultaneously the data from the ring is being transferred into the node's RECEIVE BUFFER. An empty frame is also sent in the case that the node receives a data frame, but has nothing in it's TRANSMIT BUFFER to send. In this case, the empty frame is marked as explained above.

If the node, wanting a turn to use the BUS_OUT, detects that binary ones are already being sent in the serial request line at REQ_LINE_IN, the NODE CONTROL does not alter this data but sends it through as binary ones onward to the next node. The node sets it's REQ_LINE_OUT-signal only after the requests, the binary ones, from upstream have ended. The output thereby stays active and the next node sees continuous ones. If a node, which needs a turn at the ring but has not been able to get a turn and set a request into the serial line, detects an empty frame, then it may not take use of it. This empty frame must be transmitted onward to the node, which originally inserted the request and is polling for its turn to use the ring data bus. When a node is transmitting a request to the REQ_LINE_OUT and detects a request arriving from upstream, it prevents the incoming REQ_LINE_IN from going on and completes its own request into the serial request line. After the node receives an empty frame from the data BUS_IN, it is able to begin transmitting its data frame into the ring, and, therefore, removes its own request to let the request from upstream to pass onward.

The arbitration scheme of the FSR network has the weakness of possible buffer 122 overflow when some node is under heavy traffic or having functional difficulties, e.g., component failure. Such a condition may occur when frames, addressed to the node, are arriving to the node's RECEIVE BUFFER more frequently than the peripheral can remove them from the buffer. Use of a Retransmit bit renders the possibility for restricting the amount of load in the ring. On part of the receiving node, the solution is implemented by not storing the received frame, addressed to itself, in case the RECEIVE BUFFER is still partially full of the previously received data frame, currently being processed to the peripheral. Instead, the Retransmit bit in the address portion of the incoming data frame from the ring is set in the SWITCHING BANK 1 as driven by the NODE CONTROL block's RETRANSMIT signal, and the frame is directed back to the ring BUS_OUT to be received and stored after the next cycle around the ring. The node, which originally transmitted this data frame, detects and resets the active Retransmit bit and does not remove the frame from the ring.

The resetting of the Retransmit bit is executed by the NODE CONTROL block's RETRANS_CLR signal. However, if the bit is not set, suggesting a defective receiver node, the data frame is eliminated by the transmitter by sending an empty frame, activated with the EMPTY_FRAME signal, or data frame from the TRANSMIT BUFFER to BUS_OUT. The scheme enables the node to distinguish which of its transmitted data frames are circling the ring on purpose and which are not and prevents these frames from circling the ring indefinitely, clogging the bus 106.

It will be appreciated by those skilled in the art that the node can be implemented using a Xilinx field programmable gate array (FPGA) logic. In addition, greater processing speed in the node can be achieved by replacing the FPGA with a non-programmable gate array. Also, the number of parallel lines in the data bus 106 can be increased so that the effective data rate of the data bus can be increased. For example, a 32 line wide data bus is roughly twice as fast as a 16 line wide data bus.

The preferred embodiments of the present invention can be summarized in reference to device-implemented method steps 200–234 shown in FIG. 4 for data communication in a communication network 100 (i.e., shown in FIG. 1). This data communications method includes a MAC protocol control algorithm which includes setting a turn flag to false for a particular node, if the turn flag has an undetermined state value 202. A frame available flag is set to true, if an incoming frame to the particular node is empty 202. The frame available flag is set to false 206, if an incoming frame to the particular node is not empty 204.

A frame at the particular node preferably is emptied when the frame is only addressed to the particular node and setting the frame available flag to true after emptying the frame (steps not shown in FIG. 4).

If the particular node does not have data information to send 208, then an outgoing request signal is set in an "on" state at the particular node 214 when an incoming request signal is in "on" state and an incoming frame is not empty 210. Alternatively, the outgoing request signal is set in an "off" state at the particular node 212 when the incoming request signal is in "off" state 210.

If the particular node does have data information to send 208 and if the frame available flag is false 216, then the turn flag is set to true 220 (this is also referred to as granting a turn to the particular node), if the incoming request line is in an "off" state 218. For either incoming request line state, the outgoing request signal is set in an "on" state 222.

If the particular node does have data information to send 208 and if the frame available flag is true 216, then the outgoing request signal is unchanged 228 when the incoming request line is in an "on" state 226, an incoming frame is not empty, and the turn flag is false 224. Otherwise, the turn flag is set to true 230, if the incoming request line is in an "off" state 226 and the turn flag is false 224. A frame of data information is sent in a downstream direction on the communication network 232 (this is also referred to as capturing a frame), the turn flag is set to false 232 (this means the node loses a turn so that only a predetermined number of frames (e.g., one or more frames are sent for each turn granted), and the outgoing request signal is set in an "off" state 232 when the turn flag is true 224 or 230. The outgoing request signal preferably is sent in an upstream direction on the communication network. In the preferred embodiment, the upstream direction is different from the downstream direction on the communication network.

These device-implemented MAC protocol control algorithm steps 200–234 for data communications preferably are repeated periodically while the particular node is operating in the communication network 100. In addition, these method steps preferably include ignoring incoming request signals when the particular node has been granted a turn and is waiting for an empty frame in which to send data information.

The turn is a local condition for the FSR MAC protocol control algorithm such that a plurality of nodes in the communication network may be granted a turn at one time depending on what state the incoming request signal is in at each node.

The communication network in which the FSR MAC protocol control algorithm is performed preferably consists of communication links between a plurality of nodes in the communication network. This communication network also may include one or more physical nodes which perform the functions of two or more of the plurality of nodes that form the network. These nodes operating within the physical node are called virtual nodes. The virtual nodes operate such that the frame length is increased to accommodate each of the virtual nodes and any other nodes in the communication network.

A data communication network node, as shown in FIG. 2, having a receiver 116, processor 118, and transmitter 120 can be configured to operate in accordance with the above-described preferred embodiment FSR MAC protocol control algorithm. This node preferable includes a buffer 122 operatively coupled to the receiver 116 and the processor 118 to empty the received frame when the received frame is only addressed to the node. Once the frame is emptied into the buffer, the processor 118 can replace the received frame with data information to be sent from the node when the node has a turn. This buffer 122 interfaces to peripheral devices connected to node such as engineering workstations, other data networks, or main frame computers.

The data communication network node preferably is designed such that it can be utilized in a variety of different types of communication networks. These different networks will only need a few key components so that the FSR MAC protocol control algorithm can be used. For example in a slotted ring, a parallel data bus forms the frame for communicating data information and a request signal line is used communicating the request signal. Also, a slotted ring may have a serial data bus which forms the frame for communicating data information and a separate request signal line for communicating the request signal. In addition, a time-slotted communication media can have a dedicated time slot for the request signal and at least one other time slot forming the frame. Similarly, a frequency-divided communication media can have a dedicated frequency band for the request signal and at least one other frequency band forming the frame.

Two or more of these nodes can be housed in a single hardware device (i.e., a physical node). Each of those nodes operating in the physical node are called virtual nodes. Data information is received and transmitted from a peripheral device by the physical node. In addition, the frame length is increased to accommodate each of the virtual nodes and any other nodes in the communication network.

A communication network (e.g., a FSR bus 100) can be formed from several of these nodes connected together by communication links which connect together the nodes. In this communication network, the turn is a local condition such that any number of the plurality of nodes in the communication network may be granted turns which are pending during a single time period. The granting of each turn depends on what state the incoming request signal is in at node which is to be granted a turn.

A dual direction communication network having a first communication network operating to send frames between a plurality of nodes in a first direction on a communication media and a second communication network operating to send frames between a plurality of nodes in a second direction on the communication media can be formed from the above-described communication network. The first and the second communication networks preferably are synchronized together at the communication media clock level. The advantage of a dual direction network is that frames of the same or different lengths can be sent in different directions so that the effective MAC PDU transfer rates are higher than the unidirectional communication network (e.g., like the FSR bus described-above).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of shape, size and arrangement of parts within the principles of the present invention to the full extent indicated by the broad general meaning of the terms in which the appended claims are expressed.

What is claimed is:

1. A device-implemented method of data communication in a communication network, comprising the steps of:
   (a) granting a turn, during a bus clock cycle, to a particular node having data information ready to send when an incoming request signal is in an "off" state;
   (b) emptying a frame being received at the particular node, during the bus clock cycle, when the received frame is addressed only to the particular node while simultaneously transmitting a frame of data information ready to be sent by the particular node, during the bus clock cycle;

(c) capturing an empty frame at the particular nodes, during the bus clock cycle, and sending a frame of data information in a downstream direction on the communication network, during the bus clock cycle, when the particular node is granted a turn;

(d) setting an outgoing request signal in an "off" state at the particular node, during the bus clock cycle, when the empty frame is captured;

(e) setting the outgoing request signal in an "on" state at the particular node, during the bus clock cycle, when the empty frame is not captured and a turn has been granted; and (f) setting the outgoing request signal in an "on" state at the particular node, during the bus clock cycle, when the incoming request signal is in an "on" state and an incoming frame is not empty, the outgoing request signal being sent in an upstream direction on the communication network, the upstream direction being different from the downstream direction on the communication network.

2. The method of claim 1 further comprising the step of ignoring incoming request signals when the particular node has been granted a turn and is waiting for an empty frame to capture.

3. The method of claim 1 further comprising the step of losing a turn at the particular node after capturing an empty frame such that only a predetermined number of frames are captured for each turn granted.

4. The method of claim 1 further comprising the step of setting the outgoing request signal in an "on" state at the particular node when the incoming request signal is in an "on" state, an incoming frame is not empty, and the particular node does not have data information to send.

5. The method of claim 1 further comprising the step of setting the outgoing request signal in an "off" state at the particular node when the incoming request signal is in an "off" state and the particular node does not have data information to send.

6. The method of claim 1 wherein the turn is a local condition such that a plurality of nodes in the communication network may be granted a turn at one time depending on what state the incoming request signal is in at each node.

7. The method of claim 1 wherein the communication network is a slotted ring having parallel data bus forming the frame for communicating data information and a request signal line for communicating the request signal.

8. The method of claim 1 wherein the communication network is a slotted ring having serial data bus forming the frame for communicating data information and a request signal line for communicating the request signal.

9. The method of claim 1 wherein the communication network is a time-slotted communication media having a dedicated time slot for the request signal and at least one other time slot forming the frame.

10. The method of claim 1 wherein the communication network is a frequency-divided communication media having a dedicated frequency band for the request signal and at least one other frequency band forming the frame.

11. The method of claim 1 wherein the communication network is formed by communication links between a plurality of nodes in the communication network.

12. The method of claim 11 wherein the communication network comprises a physical node having at least two of the plurality of nodes operating as virtual nodes within the physical node such that the frame length is increased to accommodate each of the virtual nodes and any other nodes in the communication network.

13. A device-implemented method of data communication in a communication network, comprising the steps of:

(a) setting a turn flag to false for a particular node, if the turn flag has an undetermined state value;

(b) setting a frame available flag to true, if an incoming frame to the particular node is empty;

(c) setting the frame available flag to false, if an incoming frame to the particular node is not empty;

(d) emptying a frame being received at the particular node when the received frame is addressed only to the particular node while simultaneously transmitting a frame of data information ready to be sent by the particular node, and setting the frame available flag to true after emptying the frame;

if the particular node does not have data information to send, (e) setting an outgoing request signal in an "on" state at the particular node when an incoming request signal is in "on" state and an incoming frame is not empty;

(f) setting the outgoing request signal in an "off" state at the particular node when the incoming request signal is in "off" state;

if the particular node does have data information to send, and if the frame available flag is false, (g) setting the turn flag to true, if the incoming request line is in an "off" state;

(h) setting the outgoing request signal in an "on" state;

if the particular node does have data information to send, and if the frame available flag is true, (i) setting the outgoing request signal in an "on" state, if the incoming request line is in an "on" state, an incoming frame is not empty, and the turn flag is false;

(j) setting the turn flag to true, if the incoming request line is in an "off" state and the turn flag is false; and (k) sending a frame of data information in a downstream direction on the communication network, setting the turn flag to false, and setting the outgoing request signal in an "off" state, if the turn flag is true, the outgoing request signal being sent in an upstream direction on the communication network, the upstream direction being different from the downstream direction on the communication network.

14. The method of claim 13 further comprising the step of repeating steps (a) through (k) while the particular node is operating in the communication network.

15. The method of claim 13 further comprising the step of ignoring incoming request signals when the particular node has been granted a turn and is waiting for an empty frame in which to send data information.

16. The method of claim 13 wherein the turn is a local condition such that a plurality of nodes in the communication network may be granted a turn at one time depending on what state the incoming request signal is in at each node.

17. The method of claim 13 wherein the communication network is formed by communication links between a plurality of nodes in the communication network, the communication network comprising at least one physical node having at least two of the plurality of nodes operating as virtual nodes within the at least one physical node such that the frame length is increased to accommodate each of the virtual nodes and any other nodes in the communication network.

18. A data communication network node, comprising:
(a) receiving means for receiving an incoming request signal and a frame from a communication network during a bus clock cycle;
(b) buffer means, operatively coupled to the receiving means, for emptying the received frame, during the bus clock cycle, when the received frame is addressed only to the node while simultaneously transmitting a frame of data information ready to be sent by the particular node, during the bus clock cycle;
(c) processing means, operatively coupled to the receiving means and the buffer means, for:
  (i) granting a turn to the node, during the bus clock cycle, when the node has data information ready to be sent and the received incoming request signal is in an "off" state;
  (ii) replacing the received frame with data information ready to be sent from the node, during the bus clock cycle, when the received frame is empty and the node has a turn such that, if the frame is emptied into the buffer means, the received frame is replaced with data information to be sent from the node when the node has a turn;
  (iii) setting an outgoing request signal in an "off" state, during the bus clock cycle, when the frame is replaced;
  (iv) setting the outgoing request signal in an "on" state, during the bus clock cycle, when the frame is not replaced and a turn has been granted; and
  (v) setting the outgoing request signal in an "on" state, during the bus clock cycle, when the incoming request signal is in an "on" state; and
(d) transmitting means, operatively coupled to the processing means, for transmitting the outgoing request signal in an upstream direction on the communication network and transmitting the frame in a downstream direction on the communication network, the upstream direction being different from the downstream direction on the communication network.

19. The data communication network node of claim 18 wherein the processing means ignores the received incoming request signal when the node has been granted a turn and is waiting for an empty frame to replace with data information to be sent.

20. The data communication network node of claim 18 wherein the processing means sets the node to lose a turn after replacing the frame such that only a predetermined number of frames are replaced with data information to be sent from the node for each turn granted to the node.

21. The data communication network node of claim 18 wherein the processing means comprises means for setting the outgoing request signal in an "on" state when the received incoming request signal is in an "on" state, an incoming frame is not empty, and the node does not have data information to be sent.

22. The data communication network node of claim 18 wherein the processing means comprises means for setting the outgoing request signal in an "off" state when the received incoming request signal is in an "off" state and the node does not have data information to be sent.

23. The data communication network node of claim 18 wherein the communication network is selected from the group consisting of:
  (a) a slotted ring having parallel data bus forming the frame for communicating data information and a request signal line for communicating the request signal;
  (b) a slotted ring having serial data bus forming the frame for communicating data information and a request signal line for communicating the request signal;
  (c) a time-slotted communication media having a dedicated time slot for the request signal and at least one other time slot forming the frame; and
  (d) a frequency-divided communication media having a dedicated frequency band for the request signal and at least one other frequency band forming the frame.

24. A physical node having at least two of the plurality of nodes of claim 18 operating as virtual nodes within the physical node such that the frame length is increased to accommodate each of the virtual nodes and any other nodes in the communication network.

25. A communication network having a plurality of nodes of claim 18 connected together by communication links between the plurality of nodes.

26. The communication network of claim 25 wherein the turn is a local condition such that any number of the plurality of nodes in the communication network may be granted turns which are pending during a single time period, the granting of each turn depending on what state the incoming request signal is in at node which is to be granted a turn.

27. A dual direction communication network having a first communication network of claim 25 operating to send frames between a plurality of nodes in a first direction on a communication media and a second communication network of claim 25 operating to send frames between a plurality of nodes in a second direction on the communication media, the first and the second communication networks being synchronized together at the communication media clock level.

28. The dual direction communication network of claim 27 wherein the first and the second communication networks send frames having different lengths.

29. The dual direction communication network of claim 27 wherein the first and the second communication networks send frames having equal lengths.

* * * * *